United States Patent Office 3,595,853
Patented July 27, 1971

3,595,853
RIBOFURANOSYL CYTOSINE AND ARABINO-
FURANOSYL CYTOSINE DERIVATIVES
Tadashi Kanai, Motonobu Ichino, and Chiaki Yamashita, Oita-ken, Japan, assignors to Kohjin Co., Ltd., Tokyo, Japan
No Drawing. Filed Apr. 1, 1969, Ser. No. 812,367
Claims priority, application Japan, Apr. 4, 1968, 43/21,760
Int. Cl. C07d 51/52
U.S. Cl. 260—211.5                    5 Claims

ABSTRACT OF THE DISCLOSURE

The invention relates to ribofuranosyl cytosine derivatives of the formula

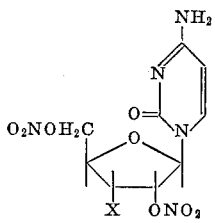

or their acid salts in which X stands for OH or $ONO_2$, and it also relates to arabinofuranosyl cytosine derivatives of the formula

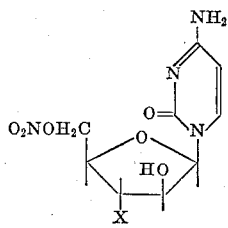

or their acid salts, and it further relates to a process for providing the above arabinofuranosyl cytosine derivatives. The ribofuranosyl cytosine derivatives of the invention are valuable intermediate compounds to provide arabinofuranosyl cytosine.

---

This invention relates to a novel chemical process, and to compounds produced thereby. More particularly, the invention is directed to a process for preparing important unnaturally occurring cytosine-1-arabinoside and novel related intermediates from cytidine. The novel intermediates, 1-(2′,5′-di-O-nitro-β-D-ribofuranosyl)cytosine or 1-(2′,3′,5′ - tri - O-nitro-β-D-ribofuranosyl)cytosine represented by Formula U and 1-(5′-O-nitro-β-D-arabinofuranosyl)cytosine or 1-(3′,5′-di-O-nitro-β-D-arabinofuranosyl)cytosine represented by Formula III, were obtained by this invention.

This invention is concerned with chemical compounds of great biological significance. It is generally known that 1-β-D-arabinofuranosyl cytosine, called "Ara-C" or "CA" in common, is active against viruses and bacteria (see, for example, Underwood, Proc. Soc. Exptl. Biol. 3, 660 (1962)). This compound has shown useful activity in the clinical treatment of caute leukemia and lymphomas (see, for example, Talley et al., Blood, 21, 352 (1963); Henderson et al., Proc. Am. Assn. Cancer Res., 6, 26 (1965); Papae et al., Proc. Am. Assn. Cancer Res., 6, 50 (1965); Carey et al., Chim. Res. 13, 337 (1965); Yu et al., Proc. Am. Assn. Cancer Res., 7, 78 (1966); Ellison et al., Proc. 9th Int. Cancer Congr., Tokyo (1967)).

Prior to this invention, some methods for preparing 1-β-D-arabinofuranosyl cytosine had been described by Evans (Evans et al., Proc. Soc. Exper. Biol. & Med., 106, 350 (1961)) and in U.S. Patent 3,116,282, starting from uracil-1-nucleoside, by Reese (Reese et al., Tetrahedron Letters, 3499 (1966)) and by Dekker, starting from cytidine (Dekker et al., Proc. Chem. Soc., 84 (1959)); J. Org. Chem., 32, 816 (1967)). Shen also had prepared it by the fusion of benzylated arabinosyl chloride with substituted cytosine (Shen et al., J. Org. Chem., 30, 835 (1965)). Evans had synthesized 1-β-D-arabinofuranosyl cytosine in the following manner. The fully acylated 1-β-D-arabinofuranosyl uracil derived from uridine by several steps was thiated with phosphorus pentasulfide to 1-β-D-arabinofuranosyl-4-thio-uracil-triacetate. The fully acylated 4-thio-uracil arabinoside was then reacted with ammonia to produce cytosine-1-arabinoside. The second method described by Reese was as follows: 1-(2′-O-mesyl-3′,5′-di-O-acetyl (or benzoyl))-β-D-ribofuranosyl-$N^4$-acetyl(or benzoyl)cytosine derived from cytidine by selective acetylation (or benzolation) at the $N^4$, 3′ and 5′ positions followed by methanesulfonylation at the 2′ position was converted to 1-(3′,5′-di-O-acetyl(or benzoyl))-β-D-arabinofuranosyl-$N^4$-acetyl(or benzoyl)cytosine. This selectively acylated cytosine-1-arabinoside was deacylated to give cytosine-1-arabinoside. The third method described by Dekker was as follows: the 3′,5′-diphosphate of $O^2$,2′-anhydro-cytidine isolated from the reaction mixture of cytidine with polyphosphoric acid was hydrolysed in warm alkaline solution to give the 3′,5′-diphosphate of 1-β-D-arabinofuranosyl cytosine. Dephosphorylation of the nucleoside diphosphate using prostatic phosphatase gave 1-β-D-arabinofuranosyl cytosine.

This invention is accomplished by taking advantage of the electron withdrawing effect of the nitro group and the ease of removing it by reduction without any changes in configuration of the structure. Cytidine or its acid salt is nitrated with fuming nitric acid to give the nitric acid salt of 2′,5′-di-O-nitro-cytidine or 2′,3′,5′-tri-O-nitrocytidine. By the electron withdrawing effect of the nitric acid ester group at the 2′ position and participation of the carbonyl group at the C2 position, the hydroxyl group at the 2′ position of the fully nitrated cytidine inverted preferentially via the $O^2$,2′-anhydro linkage under alkaline conditions 1 - (5′-O-nitro-β-D-arabinofuranosyl)cytosine and 1 - (3′,5′ - di-O-nitro-β-D-arabinofuranosyl)cytosine obtained by the inversion described above is then hydrogenated to give 1-β-D-arabinofuranosyl cytosine.

The present invention provides an improved, commercially practical process which overcomes the limitations and disadvantages of the prior art, because it provides a convenient process for converting commercially available cytidine into the corresponding arabinoside in a high yield without any other changes in its configuration.

The process of the invention is schematically represented as follows:

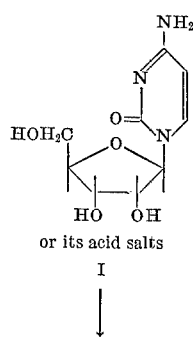

or its acid salts

I

↓

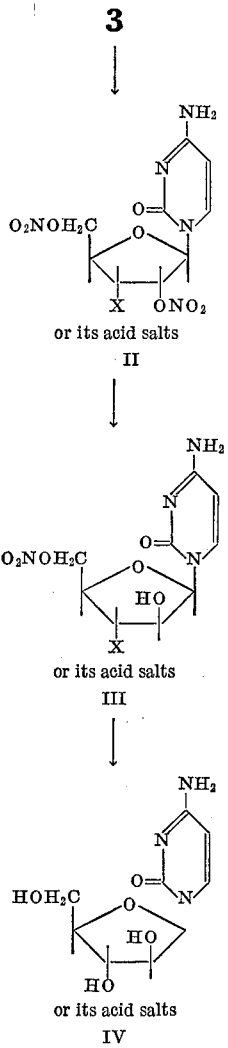

or its acid salts
II or its acid salts
III or its acid salts
IV in which X stands for OH or $ONO_2$, and the acid which constitutes the acid salt is an inorganic acid such as nitric acid, hydrochloric acid or sulfuric acid, or an organic acid such as acetic acid or formic acid.

Nitration of cytidine or its acid salt is accomplished by reaction with 90% fuming nitric acid at —20° C. for one to two hours in the presence of dehydrating agents which don't disturb the reaction, such as phosphorus pentoxide and the like.

1-(2',5'-di-O-nitro-β-D-ribofuranosyl)cytosine or 1-(2',3',5'-tri-O-nitro-β-D-ribofuranosyl)cytosine (Formula II) or their acid salts obtained above, is converted into 1-(5'-O-nitro - β-D-arabinofuranosyl)cytosine or 1-(3',5'-di-O-nitro - β-D-arabinofuranosyl)cytosine (Formula III) or their acid salts, by the reaction in alcohol with a dilute alkali such as 0.5 N KOH in ethanol, 0.5 N NaOH in methanol and preferably alcoholic metal alkoxide such as sodium methoxide in methanol, potassium methoxide in methanol, sodium ethoxide in ethanol, potassium ethoxide in ethanol and sodium isopropoxide in isopropanol, and/or with a large amount of an amine such as dimethylamine, trimethylamine, triethylamine or aniline. This inversion reaction is carried out at 30° C. to 80° C., preferably at 40° C. to 60° C. 1-(5'-O-nitro-β-D-arabinofuranosyl)cytosine or 1-(3',5'-di-O-nitro-β-D-arabinofuranosyl) cytosine or their acid salts is isolated from the reaction mixture as a glass.

1 - (5'-O-nitro-β-D-arabinofuranosyl)cytosine or 1-(3',5'-di-O-nitro-β-D-arabinofuranosyl)cytosine or their acid salts dissolved in 70% alcohol is then hydrogenated to 1-β-D-arabinofuranosyl cytosine or its acid salt in a stream of hydrogen at room temperature under atmospheric pressure with the aid of a catalyst used generally to reduce the nitro group, e.g. 5% palladium on calcium carbonate, 5% palladium on barium sulfate, 5% palladium on carbon, zinc and so on. The resulting arabinosyl cytosine is obtained in the free state or as the hydrochloric acid salt.

The following examples are illustrative of the process and products of the present invention, but are not to be construed as limiting.

EXAMPLE 1

Preparation of 1-(2',3',5'-tri-O-nitro-β-D-ribofuranosyl) cytosine and its nitrate 20 g. of crystalline cytidine was added to 60 ml. of cooled fuming nitric acid at —20° C. with vigorous stirring. When cytidine was dissolved completely, 20 g. of powdered phosphorus pentoxide was added portionwise to the cooled solution and the resulting yellow solution was kept at —20° C. for 2 hours. The clear solution was poured into 1000 g. of crushed ice with stirring. The precipitated solid was filtered and washed with ice water several times. The filtrate was concentrated in vacuo to 300 ml. and adjusted to pH 3 by the addition of 5 N sodium hydroxide while cooling in an ice bath. The resulting solution was concentrated to 200 ml. to give a white precipitate which was filtered and washed with ice water. The combined precipitate was dried in a desiccator over phosphorus pentoxide for ten hours. The dried solid was dissolved in 500 ml. of refluxing ethyl alcohol and undissolved material was removed by decantation. The resulting ethanolic solution was concentrated to 100 ml. in vacuo and cooled to give 1-(2',3',5'-tri-O-nitro-β-D - ribofuranosyl)cytosine nitrate as needles. Yield was 23.4 g., M.P. 173° C. (dec.).

Analysis.—Calculated for $C_9H_{10}N_6O_{11} \cdot HNO_3$ (percent): C, 24.50; H, 2.51; N, 22.22. Found (percent): C, 24.92; H, 2.89; N, 21.86.

1-(2',3',5'-tri-O-nitro-β-D - ribofuranosyl)cytosine was obtained in the following manner. To a solution of 10 g. of 1-(2',3',5'-tri-O-nitro-β-D-ribofuranosyl)cytosine nitrate dissolved in 400 ml. of 85% methanol was added excess sodium bicarbonate and the suspension was stirred overnight at 40° C. Salts were removed by filtration. The filtrate was concentrated to dryness under reduced pressure and the residue was extracted with absolute methanol. The extract was evaporated to a small volume and cooled to give 8.14 g. of 1-(2',3',5',tri-O-nitro-β-D-ribofuranosyl) cytosine having a melting point of 164–166° C.

EXAMPLE 2

Preparation of 1-(3',5'-di-O-nitro-β-D-arabinofuranosyl) cytosine

Method A.—3.78 g. of 1-(2',3',5'-tri-O-nitro-β-D-ribofuranosyl)cytosine was dissolved in 150 ml. of refluxing ethyl alcohol. 25 ml. of 0.5 N KOH was added dropwise to the solution at 60° C. over a 3 hour period, and the resulting reaction mixture was allowed to stand overnight at room temperature. The brown colored solution was concentrated to dryness in vacuo and the residue was extracted with 40 ml. of refluxing anhydrous ethyl alcohol. Concentration of this extract gave 2.8 g. of 1-(3',5'-di-O-nitro-β-D-arabinofuranosyl)cytosine as a pale yellow glass.

Method B.—1.80 g. of 1-(2',3',5'-tri-O-nitro-β-D-ribofuranosyl)cytosine was dissolved in 70 ml. of methyl alcohol and 8 ml. of triethylamine. The solution was refluxed for 2 hours and evaporated to dryness under reduced pressure. The residue was extracted with 100 ml. of mixed solvent (ethylacetate:methanol 5:1). The extract was evaporated to dryness and the residue was extracted once more with ethylacetate. The ethylacetate solution was dried over sodium sulfate and evaporated to give 1.32 g. of 1-(3',5'-di-O-nitro-β-D-arabinofuransoyl)cytosine as a pale yellow glass.

EXAMPLE 3

Preparation of 1-β-D-arabinofuranosyl cytosine

A solution of 2.8 g. of the 1-(3′,5′-di-O-nitro-β-D-arabinofuranosyl)cytosine obtained in Example 2 above in 60 ml. of 70% methanol was adjusted to pH 2 with 1 N hydrochloric acid. The solution was then shaken with 4.5 g. of 5% Pd on BaSO₄ for 5 hours at room temperature under atmospheric pressure in a stream of hydrogen. The Pd catalyst was removed by filtration and the solution was evaporated to give a syrup. Crystallization of the product from 90% ethanol gave 1.42 g. of 1-β-D-arabinofuranosyl cytosine as prisms melting at 212 to 214° C.

*Analysis.*—Calculated for $C_9H_{13}N_3O_5$ (percent): C, 44.45; H, 5.39; N, 17.28. Found (percent): C, 44.38; H, 5.60; N, 17.12.

Ultraviolet absorption:

$$\lambda_{max.}^{pH\ 1}\ 280\ m\mu.(Am\ 13,312)$$

$$\lambda_{max.}^{pH\ 12}\ 274\ m\mu:\ 228–239\ m\mu\ (Am\ 9,832:\ 8,291)$$

Am: molar absorbancy

Optical rotation:

$$[\alpha]_D^{24} +158°\ (c.\ 0.5\ in\ water)$$

Rf.—0.66 (5 M ammonium acetate, pH 9.5:saturated sodium borate solution:ethanol:0.5 M EDTA=20:80:220:0.5 v./v. ascending).

EXAMPLE 4

Preparation of 1-β-D-arabinofuranosyl)cytosine hydrochloride

The solution obtained after hydrogenation and removal of the palladium catalyst as in Example 3 above, starting with 1 g. of 1-(3′,5′-di-O-nitro-β-D-arabinofuranosyl) cytosine, was adjusted to pH 1 by the addition of 1 N hydrochloric acid and evaporated in vacuo to give 0.54 g. of 1-β-D-arabinofuranosyl cytosine hydrochloride as needles. Recrystallization from methanol gave pure material having a melting point of 186–187° C.

What is claimed is:

1. Ribofuranosyl cytosine derivatives having the formula

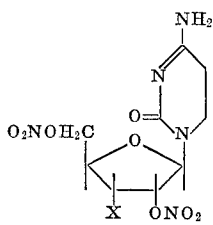

in which X is selected from the group consisting of OH and ONO₂, and acid salts thereof wherein said acids are selected from the group consisting of nitric acid, hydrochloric acid, sulfuric acid, acetic acid, and formic acid.

2. The process consisting of the nitration by fuming nitric acid in the presence of a dehydrating agent of a compound selected from the group consisting of cytidine and its acid salts to produce ribofuranosyl cytosine derivatives having the formula

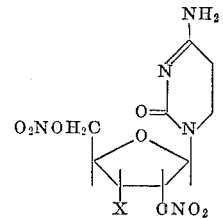

in which X is selected from the group consisting of OH and ONO₂, and acid salts thereof wherein said acids are selected from the group consisting of nitric acid, hydrochloric acid, sulfuric acid, acetic acid, and formic acid.

3. A compound selected from the group consisting of 1-(2′,3′,5′,-O-nitro-β-D-ribofuranosyl)-cytosine and acid salts thereof wherein said acids are selected from the group consisting of nitric acid, hydrochloric acid, sulfuric acid, acetic acid, and formic acid.

4. A process for producing 1-β-D-arabinofuranosyl cytosine characterized in that:
   (a) a compound selected from the group consisting of 2′,5′-di-O-nitro-cytidine; 2′,3′,5′-tri-O-nitro-cytidine; mixtures thereof; and acid salts thereof wherein said acids are selected from the group consisting of nitric acid, hydrochloric acid, sulfuric acid, acetic acid, and formic acid, is reacted with a base to cause inversion and hydrolysis of the O-nitro group at the 2′-position to OH; and
   (b) reducing the remaining O-nitro groups to OH.

5. The process of claim 4 wherein said 2′,5′-di-O-nitro-cytidine; 2′,3′,5′-tri-O-nitro-cytidine; and acid salts thereof are prepared by the nitration by fuming nitric acid in the presence of a dehydrating agent of a compound selected from the group consisting of cytidine and acid salts thereof wherein said acids are selected from the group consisting of nitric acid, hydrochloric acid, sulfuric acid, acetic acid, and formic acid.

References Cited

UNITED STATES PATENTS

| | | | |
|---|---|---|---|
| 3,155,646 | 11/1964 | Hunter | 260—211.5 |
| 3,183,226 | 5/1965 | Hunter | 260—211.5 |
| 3,463,772 | 8/1969 | Nagyvary | 260—211.5 |

OTHER REFERENCES

Pigman: "The Carbohydrates," 1957, Academic Press, Inc., New York, N.Y., pp. 168–170.

ELBERT L. ROBERTS, Primary Examiner

J. R. BROWN, Assistant Examiner